July 21, 1931.   R. S. SCRUGGS   1,815,527
EDIBLE RECEPTACLE
Filed July 22, 1929
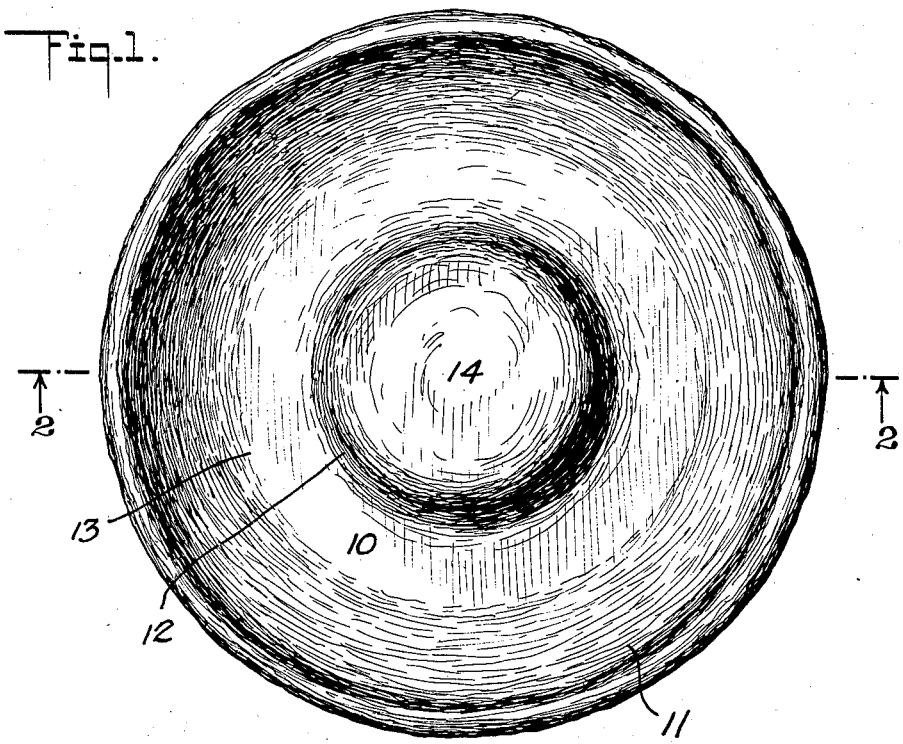
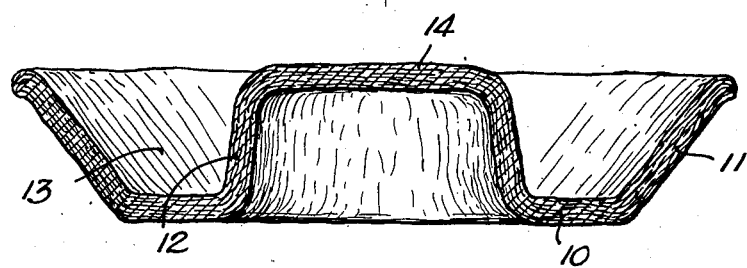
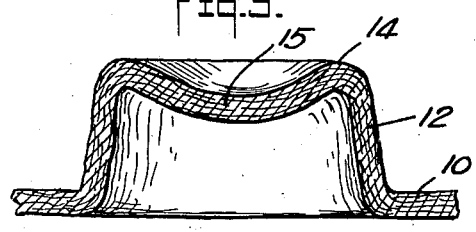
INVENTOR
RAMON S. SCRUGGS
BY
ATTORNEYS Patented July 21, 1931

1,815,527

UNITED STATES PATENT OFFICE

RAMON S. SCRUGGS, OF LOS ANGELES, CALIFORNIA

EDIBLE RECEPTACLE

Application filed July 22, 1929. Serial No. 380,081.

My invention relates to and has for its purpose the provision of an edible receptacle preferably, although not necessarily, formed of pastry dough stock in a manner to receive and confine an edible filler which co-operates with the receptacle to form a pie, with means in the receptacle for supporting a body of frozen confection such as ice cream or other edible substance for eating with the pie, so that the complete article of food will constitute what is generally known as pie a la mode, which, by the provision of my novel receptacle, is rendered capable of being served in a highly attractive and appetizing manner.

I will describe only two forms of edible receptacles embodying my invention and will then point out the novel features thereof in claims.

In the accompanying drawings,

Figure 1 is a view shcwing in plan one form of edible receptacle embodying my invention.

Figure 2 is a vertical sectional view taken on the line 2—2 of Figure 1 and looking in the direction of the arrows, and Figure 3 is a fragmentary view similar to Figure 2 and illustrating a modified form of edible receptacle embodying my invention.

Referring specifically to the drawings in which similar reference characters designate similar parts in each of the several views, my invention in its present embodiment is preferably, although not necessarily, formed of pastry dough stock which may be molded and then suitably baked so that the resulting receptacle will be preferably of circular contour in plan and will have a bottom wall 10 from the marginal edge of which projects upwardly and outwardly, a continuous circular outer side wall 11 co-operating with the bottom wall 10 and a continuous circular inner side wall 12 rising from the latter, to define an annular well 13 in which a quantity of edible filler (not shown) is adapted to be received and confined, the filler co-operating with the edible receptacle to form a pie.

The inner side wall 12 is spanned by a horizontal platform 14 which co-operates with the inner side wall to form an inverted cup shaped portion rising from the bottom wall 10 and preferably disposed centrally in the receptacle so as to be bounded by the well 13. On the platform 14, a body of frozen confection such as ice cream or other edible substance (not shown) is adapted to be placed and supported for eating with the pie; and the platform is at a height sufficient to support the frozen confection above the level of and out of contact with the filler in the well so as to prevent mixing of the confection with the filler. The complete article of food provided by the receptacle, filler and frozen confection constitutes what is generally known as pie a la mode, which by the provision of my novel form of receptacle can be served in a manner highly attractive and appetizing to the customer.

In order to prevent lateral displacement of the body of frozen confection from the platform 14, the latter may be dished or cupped as indicated at 15 in Figure 3, so as to provide a shallow pocket in which the confection can rest.

The receptacle embodying my invention requires but a slight increase in the amount of dought stock necessary to form the crust of a pie of similar size and can be molded in a suitably shaped pan (not shown) with the utmost ease and dispatch, so as to render the receptacle capable of being produced in competition with the conventional form of pie crust.

Although I have herein shown and described only two forms of edible receptacles embodying my invention, it is to be understood that various changes and modifications may be made therein without departing from the spirit of the invention and the spirit and scope of the appended claims.

I claim:

1. As an article of manufacture, an edible receptacle of cup shape adapted to receive and confine an edible filler therein and having a centrally disposed inverted cup shaped portion on which a body of frozen confection is adapted to be placed and supported, said portion being of sufficient height to support the body of frozen confection above the level of and out of contact with the filler in the receptacle.

2. As an article of manufacture, an edible receptacle having a bottom wall, a continuous outer side wall and a continuous inner side wall co-operating to define a well in which an edible filler is adapted to be received, and a platform spanning the inner wall on which a body of frozen confection is adapted to be supported.

3. As an article of manufacture, an edible receptacle having a well adapted to receive and confine an edible filler, and having a platform therein on which a body of frozen confection is adapted to be placed and supported.

RAMON S. SCRUGGS.